US007480634B1

(12) United States Patent  (10) Patent No.: US 7,480,634 B1
Cornelius  (45) Date of Patent: Jan. 20, 2009

(54) METHOD AND SYSTEM FOR SAVING AND INVESTING THROUGH USE OF A MONEY MANAGEMENT CARD AND POOLED INVESTMENT ACCOUNTS

(75) Inventor: Harry Cornelius, Palm Beach, FL (US)

(73) Assignee: Cornelius Marketing, Palm Beach, FL (US)

( * ) Notice: Subject to any disclaimer, the term of this patent is extended or adjusted under 35 U.S.C. 154(b) by 1348 days.

(21) Appl. No.: 10/122,763

(22) Filed: Apr. 15, 2002

Related U.S. Application Data

(60) Provisional application No. 60/284,173, filed on Apr. 17, 2001.

(51) Int. Cl.
*G06Q 40/00* (2006.01)
(52) U.S. Cl. ...................................................... 705/39
(58) Field of Classification Search ........................ None
See application file for complete search history.

(56) References Cited

U.S. PATENT DOCUMENTS

| | | | |
|---|---|---|---|
| 4,742,457 A | 5/1988 | Leon et al. ................... | 364/408 |
| 4,751,640 A | 6/1988 | Lucas et al. ................... | 364/408 |
| 5,056,019 A | 10/1991 | Schultz et al. .............. | 364/405 |
| 5,200,889 A | 4/1993 | Mori ........................... | 364/401 |
| 5,206,803 A | 4/1993 | Vitagliano et al. .......... | 364/408 |
| 5,287,268 A | 2/1994 | McCarthy ................... | 364/405 |
| 5,621,640 A | 4/1997 | Burke | |
| 5,787,404 A * | 7/1998 | Fernandez-Holmann ..... | 705/35 |
| 5,866,889 A * | 2/1999 | Weiss et al. ................. | 235/379 |
| 5,878,405 A | 3/1999 | Grant et al. ................... | 705/39 |
| 5,946,669 A | 8/1999 | Polk ............................. | 705/40 |
| 5,949,044 A | 9/1999 | Walker et al. ................ | 235/379 |
| 5,956,700 A | 9/1999 | Landry ........................ | 705/40 |
| 5,970,480 A * | 10/1999 | Kalina ........................ | 705/37 |
| 6,012,048 A | 1/2000 | Gustin et al. .................. | 705/39 |
| 6,016,482 A | 1/2000 | Molinari et al. ............... | 705/35 |
| 6,029,887 A * | 2/2000 | Furuhashi et al. ........... | 235/379 |
| 6,032,135 A | 2/2000 | Molano et al. ................ | 705/41 |
| 6,070,153 A * | 5/2000 | Simpson .................. | 705/36 R |

(Continued)

FOREIGN PATENT DOCUMENTS

WO  WO 96/34358  10/1996
WO  WO 03/030054  4/2003

OTHER PUBLICATIONS

U.S. Appl. No. 10/823,850, filed Apr. 14, 2004, Burke.
U.S. Appl. No. 09/611,905, filed Jul. 7, 2000, Burke.

*Primary Examiner*—Hani Kazimi
*Assistant Examiner*—Michael R Zecher
(74) *Attorney, Agent, or Firm*—Workman Nydegger

(57) ABSTRACT

A money management card adapted to provide a method of saving and investing for a user of the money management card. The money management card is associated with an investment account which allows money to be pooled for the purpose of investing. The investment account allows the user to allocate the balance of the investment account in one or more investment vehicles. The user is not required to satisfy a minimum amount before placing a portion of the balance in the investment vehicle. The balance of the investment account is funded by additional amounts added to purchase amounts for purchases made with the card.

24 Claims, 6 Drawing Sheets

U.S. PATENT DOCUMENTS

| | | | |
|---|---|---|---|
| 6,088,682 A | 7/2000 | Burke | |
| 6,092,052 A | 7/2000 | Ziarno | 705/21 |
| 6,105,865 A * | 8/2000 | Hardesty | 235/380 |
| 6,112,191 A | 8/2000 | Burke | 705/41 |
| 6,131,810 A * | 10/2000 | Weiss et al. | 235/379 |
| 6,173,269 B1 | 1/2001 | Solokl et al. | 705/35 |
| 6,185,544 B1 | 2/2001 | Sakamoto et al. | 705/40 |
| 6,202,054 B1 | 3/2001 | Lawlor et al. | 705/42 |
| 6,216,115 B1 | 4/2001 | Barrameda et al. | 705/40 |
| 6,243,688 B1 * | 6/2001 | Kalina | 705/14 |
| 6,282,522 B1 * | 8/2001 | Davis et al. | 705/41 |
| 6,315,193 B1 * | 11/2001 | Hogan | 235/379 |
| 6,354,490 B1 * | 3/2002 | Weiss et al. | 235/379 |
| 6,450,407 B1 * | 9/2002 | Freeman et al. | 235/492 |
| 6,598,028 B1 * | 7/2003 | Sullivan et al. | 705/36 R |
| 6,631,358 B1 * | 10/2003 | Ogilvie | 705/39 |
| 6,876,971 B1 | 4/2005 | Burke | |
| 6,941,279 B1 * | 9/2005 | Sullivan | 705/35 |
| 7,072,851 B1 * | 7/2006 | Wilcox et al. | 705/14 |
| 7,076,458 B2 * | 7/2006 | Lawlor et al. | 705/35 |
| 7,089,202 B1 * | 8/2006 | McNamar et al. | 705/35 |
| 7,171,370 B2 | 1/2007 | Burke | |
| 2001/0032157 A1 * | 10/2001 | Dannenberg et al. | 705/36 |
| 2003/0050889 A1 | 3/2003 | Burke | |
| 2003/0083930 A1 | 5/2003 | Burke | |
| 2006/0122923 A1 | 6/2006 | Burke | |
| 2006/0206420 A1 | 9/2006 | Burke | |
| 2007/0033134 A1 | 2/2007 | Carretta et al. | |
| 2007/0034688 A1 | 2/2007 | Burke | |
| 2007/0094130 A1 | 4/2007 | Burke | |

* cited by examiner

METHOD AND SYSTEM FOR SAVING AND INVESTING THROUGH USE OF A MONEY MANAGEMENT CARD AND POOLED INVESTMENT ACCOUNTS

BACKGROUND OF THE INVENTION

1. Related Applications

This application claims priority to U.S. Provisional Patent Application Ser. No. 60/284,173, filed on Apr. 17, 2001, entitled MONEY MANAGEMENT USING A CARD, which is incorporated herein in its entirety by reference.

2. The Field of the Invention

The present invention extends to both methods and systems for using a money management card. In particular, the present invention relates to a money management card providing an investment account that is linked to a pooled account. The money management card and investment account are adapted to save and invest a user's assets based on the user's spending.

3. Background and Relevant Art

The use of money management cards that allow a user to make purchases is an important aspect of modern commerce. The credit card industry provides vast amounts of credit to consumers and business alike to facilitate the purchase of goods, services, and other necessities using money management cards. Money management cards can include a variety of cards including, but not limited to, credit cards, automated teller machine (ATM) cards, check cards, and the like.

In recent years, the financial industry has expanded the use of money management cards beyond simply providing a means of making purchases. Money management cards have been utilized in a variety of roles including airline frequent flier programs, cash back incentives, and discount programs. These programs typically represent incentive programs adapted to encourage card users to use the money management card for purchases. The issuer of the card, at times in connection with other merchants, subsidizes the incentive programs with revenue generated from the credit card business. The subsidies are offered as a benefit of membership and are often linked to the amount of purchases made using the card.

Notwithstanding the incentive offered by such cards, credit card spending is typically associated with lessening of a user's assets. When the user makes purchases using a money management card, the user is spending financial assets to make purchases of goods, services, or other necessities. Though some cash back and investment mechanisms associated with money management cards provide a method of receiving a return of a portion of all purchases made using the card, typically such mechanisms are offered merely as a promotion and do not provide a meaningful method of saving or investing the user's assets. Additionally, investment mechanisms associated with money management cards that provide access to investment instruments typically require that the user satisfy dollar minimums associated with the investment instruments.

BRIEF SUMMARY OF THE INVENTION

The present invention extends to both methods and systems for utilizing a money management card. In particular, the present invention relates to a money management card that provides a mechanism for saving and investing a user's assets. An investment account that is linked with a pooled investment vehicle is funded by a money management card for the benefit of a user. The investment account allows the user to invest in one or more investment vehicles. The user is not required to satisfy a minimum amount before placing funds in the investment vehicle. The investment account is funded by additional amounts added to the purchases made with the card.

The user utilizes the money management card provided by the issuer to purchase goods, services, or the like from a third party. An additional amount is added to the purchase amount of the goods and/or services by the issuer. The additional amount is credited to the user's investment account. The pooled account is provided by a manager that is capable of pooling investments from multiple individual investment accounts for the purpose of investing in investment vehicles. Alternatively, the issuer can direct payment of additional amounts into a pooled account for investing in investment vehicles. The investment account has a balance representing the amount of total investments in the user's investment account. The user designates a portion of the balance to be placed in at least one of a plurality of investment vehicles associated with the investment account. The performance of the investment vehicles corresponds with the performance of the investment account.

The funds from the payment of the additional amount are pooled with finds from other users' investment accounts in a pooled account. As used herein, a pooled account is a method or system that allows money to be aggregated (from more than one source or more than one individual account) in a way that will allow funds to be placed in investment vehicles. The pooled account is administered by a manager. The manager of the pooled account can be the issuer, a company related to the issuer, an aggregator, an individual, or any person or entity that performs administrative functions with respect to the pooled account and assisting a user to make pooled investments in investment vehicles. The pooled account can either be held in the name of each investor or user or held in the name of the manager or some third party subject to direction from the user for investment choices or from the direction from a third party manager. In one embodiment of the present invention, the manager comprises a third party aggregator that offers the investment account associated with the pooled account to a user and/or issuer. The third party aggregator can offer products and services to the user and/or issuer independently of the products and services offered by the issuer. In an alternative embodiment, the issuer interfaces directly with the user to offer the products and/or services provided indirectly from the third party aggregator.

In still another embodiment, the issuer provides a money management card to a user where the investment choice for the user is determined by obtaining the money management card. Under this alternative embodiment, the money management card is tied to the type of investment vehicle obtained by the pooled account.

The manager of the pooled account invests the funds of the pooled account in a plurality of investment vehicles in accordance with the users investment choices. In the preferred embodiment of the present invention, pooling of funds permits the user to invest a portion of the balance in the investment account in an investment vehicle without being subject to a minimum investment amount. This allows the user to allocate any portion of the balance of the user investment account to any one of a plurality of investment vehicles without requiring a minimum amount that must be allocated to the investment vehicle.

In one embodiment of the present invention, the additional amount is funded by the user. In an alternative embodiment of the present invention, the additional amount or any portion thereof is funded by the issuer. Still in another alternative embodiment of the present invention, the additional amount or any portion thereof is funded by a merchant. In still yet another alternative embodiment of the present invention, the additional amount or any portion thereof is funded by the manager. The additional amount can be calculated utilizing a variety of methods including, but not limited to, a calculation based on a set amount, an amount of each transaction, as a percentage of total spending, or other similar method. The user or the issuer can select the method used to calculate the additional amount.

In one embodiment, the additional amount is placed in the user's investment account. The additional amount is pooled with additional amounts from other users. It is then invested based on the user's allocation of the balance of the investment account. The balance of the investment account varies based on the performance of the investment vehicle to which the balance is allocated.

In another embodiment, the additional amount is pooled with additional amounts charged to other users' in the pooled account. The balance of the user's investment account is adjusted based on the additional amount placed in the pooled account. The user allocates the balance of the investment account to one or more investment vehicles. The balance of the investment account is adjusted by the issuer based on the performance of the investment vehicles.

In one embodiment of the present invention, the pooled account is associated with a plurality of investment vehicles in which the funds are invested. Similarly, the investment accounts are associated with a plurality of investment vehicles. The relationship between the plurality of investment vehicles of the investment accounts and the pooled account can be configured such that both include the same investment vehicles. Alternatively, the investment vehicles provided to the user can be a subset of the investment vehicles in which the funds of the pooled account are invested. In one embodiment, the user can be provided with a tailored set of investment vehicles that are a subset of the investment vehicles in which the funds of the pooled account are invested. In yet another embodiment of the present invention, the manager supplies investment recommendations (i.e. investment packages) that provide users with a method of allocating the balance of the investment account. In one embodiment of the present invention, the investment recommendations are based on a given investment strategy. The manager can invest funds of the pooled account based, in whole or in part, on the investment decisions of the users. The manager can alternatively invest the finds of the pooled account independently of user investment choices and allocations.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both methods and systems for using a money management card. In particular, the present invention relates to a money management card adapted to facilitate saving and investment of assets based on purchases made with the card. The money management card provides an investment account to a user that is associated with a pooled account. The investment account allows the user to invest a portion of a balance in the investment account in one or more investment vehicles without being required to satisfy a minimum amount. The balance in the investment account is funded by an amount added to purchase amounts made when the user makes a purchase using the card. The additional amounts are used to finance the balance in the investment account. The additional amount is calculated using a method pre-selected by the user or issuer. This allows the user to pre-establish a savings plan that corresponds with purchases made using the money management card.

Figure 1:
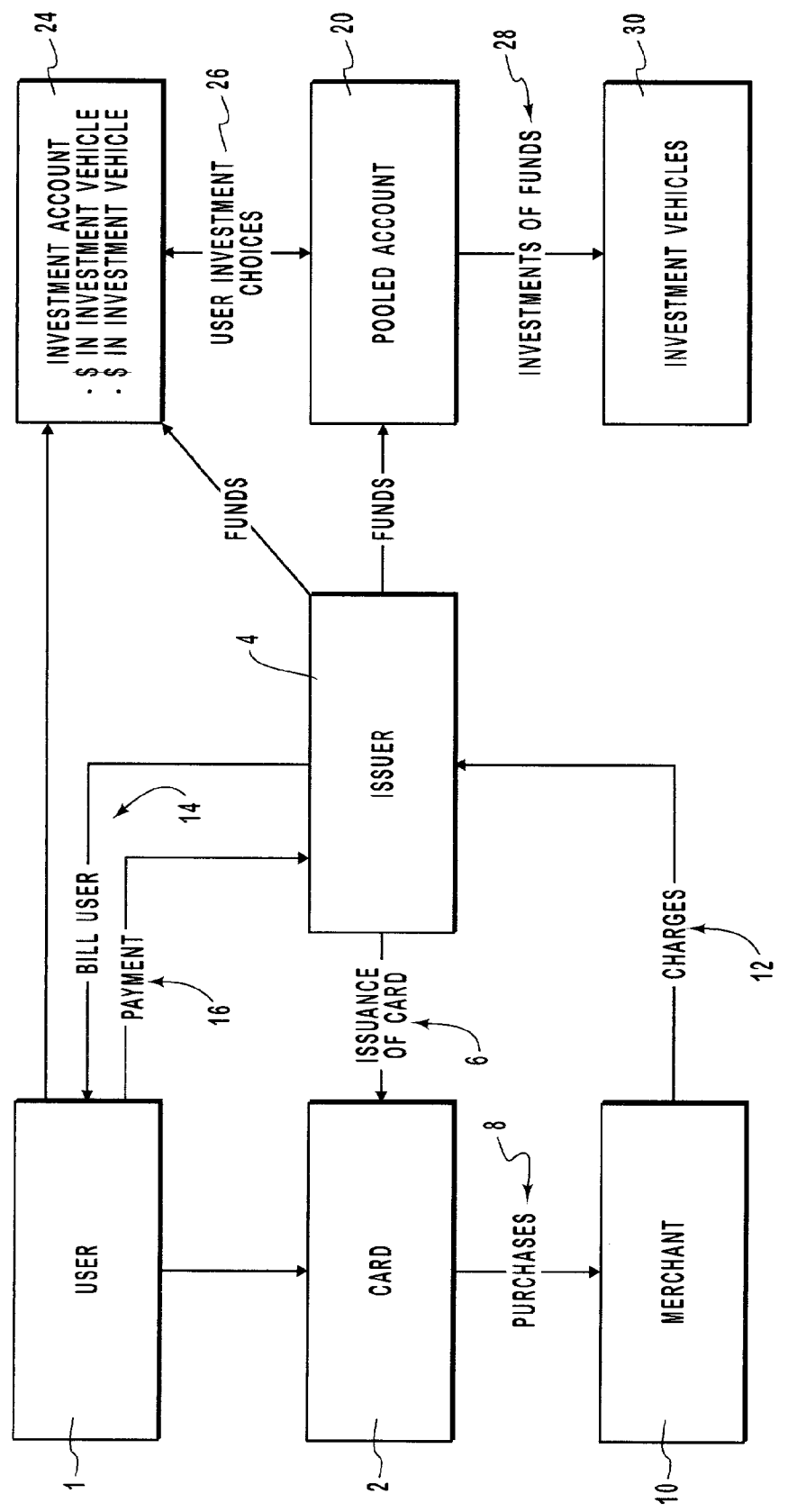
FIG. 1 is a block diagram of an illustrative embodiment of the present invention illustrating an environment in which a money management card is utilized as an investment vehicle.

With reference now to FIG. 1 there is shown a block diagram of an illustrative embodiment of the present invention illustrating a method by which the money management card is utilized as an investment vehicle. In the method there is shown a user 1, a card 2, and an issuer 4. The user of the present invention can be an individual consumer, couple, family, business, organization, or other user that typically utilizes money management cards. The issuer 4 can be any company, financial institution, or other entity that offers services in connection with a money management card. The issuance of card 6 by issuer 4 provides user 1 access to, and use of, card 2.

Utilizing card 2, the user makes purchases 8 from a merchant 10. Merchant 10 can be any business, organization, firm, or individual that accepts a money management card as a form of payment for goods, services, or other items. The purchase amount is then accumulated with other purchase amounts as a series of charges 12 which are then billed to issuer 4. The purchase amount can include both the cost of the goods and/or services and any permissible additional charges such as sales tax or other fees.

Once received by issuer 4, issuer pays merchant 10 for charges 12 corresponding to the purchase amount. The charges 12 are recorded in a user charge account. The charge account is utilized to track purchases 8 made utilizing card 2.

A purchase amount is maintained in the charge account corresponding to purchases 8. The issuer utilizes the purchase amount to calculate an additional amount to be added to the purchase amount. The issuer sends user 1 a bill 14 for an amount associated with the use of card 2. The user sends issuer 4 a full or partial payment 16 in response to bill 14. It will be understood that the current method may be further adapted to an instance of a debit card where in lieu of steps relating to payment in response to a bill, the payment step is merely replaced by appropriate authorization to debit the users account in response to a specific charge.

The additional amount added to the purchase amount can be determined using a variety of methods. In one embodiment of the present invention, a single method of calculating an additional amount is utilized for all users. In an alternative method of the present invention, a plurality of methods of calculating the additional amount are provided. The method used to calculate the additional amount can be determined by the issuer. Alternatively, the user can select a method to calculate the additional amount from the plurality of methods of calculating the additional amount. The additional amount can be calculated for each transaction, for more than one transaction, or for purchase amount totals for a given billing cycle. The additional amount can be calculated based on a set dollar amount, a percentage of the purchase amount, or a variable percentage of the purchase amount that varies depending on purchase amount totals.

In one embodiment of the present invention the additional amount is funded by the user. In this embodiment, the issuer bills the user for the purchase amount and the additional amount. The issuer of the card is authorized by the user to add the additional amount to the purchase amount. The issuer can bill the user for the purchase amount and the additional amount in a single statement. Alternatively, the purchase amount and the additional amount can be billed separately. Where the additional amount is funded by the user, payment comprises payment of the purchase amount and the additional amount.

In an alternative embodiment of the present invention, the additional amount or portion thereof is funded by the issuer, the manager, or a merchant. In this embodiment billing and payment may only be for the purchase amount. While the present invention is discussed primarily with reference to additional amounts and purchase amounts, it will be understood that charges associated with typically money management cards are not limited to purchase amounts and additional amounts. Money management cards may utilize other charges such as interest charges, late charges, financing charges and the like. The focus on additional amounts and purchase amounts is used to more clearly focus on the inventive aspects of the present invention.

Payment of the purchase amount is utilized to satisfy charges of the charge account. The finds from the additional amount are placed in an investment account 24 that are placed in pooled account 20. Alternatively, the issuer could place the additional amount directly either into investment account 24 or pooled account 20. Upon crediting the additional amount to an investment account 24, the user conducts investment choice 26 to determine the allocation of the balance of investment account 24 in one or more investment vehicles 30. In the preferred embodiment of the present invention, investment account 24 includes a balance that comprises funds from all additional amounts paid by user 1.

The funds of pooled account 20 are invested in investment vehicles 30. The pooled account 20 can be comprised entirely of funds from user investment accounts. Alternatively, the pooled account can also be comprised of finds from other sources, such as funds provided by the issuer, other investors, or similar sources.

The pooled account is administered by a manager. The manager of the pooled account invests the finds of the pooled account in investment vehicles. The manager of the pooled account can be the issuer, a company related to the issuer, an aggregator, an individual, or any person or entity that performs administration functions with respect to the pooled account and/or the individual investment accounts through an arrangement with the issuer of the money management card. In one embodiment of the present invention, the manager comprises a third party aggregator that offers the investment account associated with the pooled account to a user and/or issuer. The third party aggregator can offer products and services to the user and/or issuer independently of the products and services offered by the issuer. In an alternative embodiment, the issuer interfaces directly with user to offer the products and/or services provided indirectly from the third party aggregator.

In one embodiment of the present invention the additional amount is placed in the investment account 24. The placing of the additional amount in an investment account can entail adjusting a balance of the investment account based on the placement of the additional amount in the investment account. The investment account 24 has a plurality of investment vehicles. In one embodiment of the present invention the plurality of investment vehicles associated with the investment account are selected by the user. The user designates a portion of the additional amount to be placed into at least one of said plurality of investment vehicles. Any amount can be placed into an investment vehicle. The user is not required to satisfy a minimum amount before placing said portion of the additional amount into one of the plurality of investment vehicles. The user is not required to satisfy a minimum amount due to the pooling of the additional amount with additional amounts of other users. The additional amount placed in each of the plurality of investment vehicles is pooled with portions of the additional amounts of other users placed into the investment vehicles.

As previously mentioned, the user allocates the balance of the investment account to one or more of the plurality of investment vehicles. This can be accomplished in a variety of methods within the scope and spirit of the present invention. For example, the user can allocate the balance of the investment account by designating percentages of the investment account to be invested in one or more of the investment vehicles. The balance of the investment account can also be allocated based on dollar amounts to be invested in the investment vehicles. The allocation of the balance of the investment account can also be based on allocation recommendations provided by the manager or some third party advisor. Allocation recommendations can be presented in a variety of forms including investment packages, recommendations of high performance investment vehicles, recommendations based on designated investment strategies, or the like. In one embodiment, the user selects one of a plurality of allocation recommendations to allocate the balance of the investment account.

Figure 2:
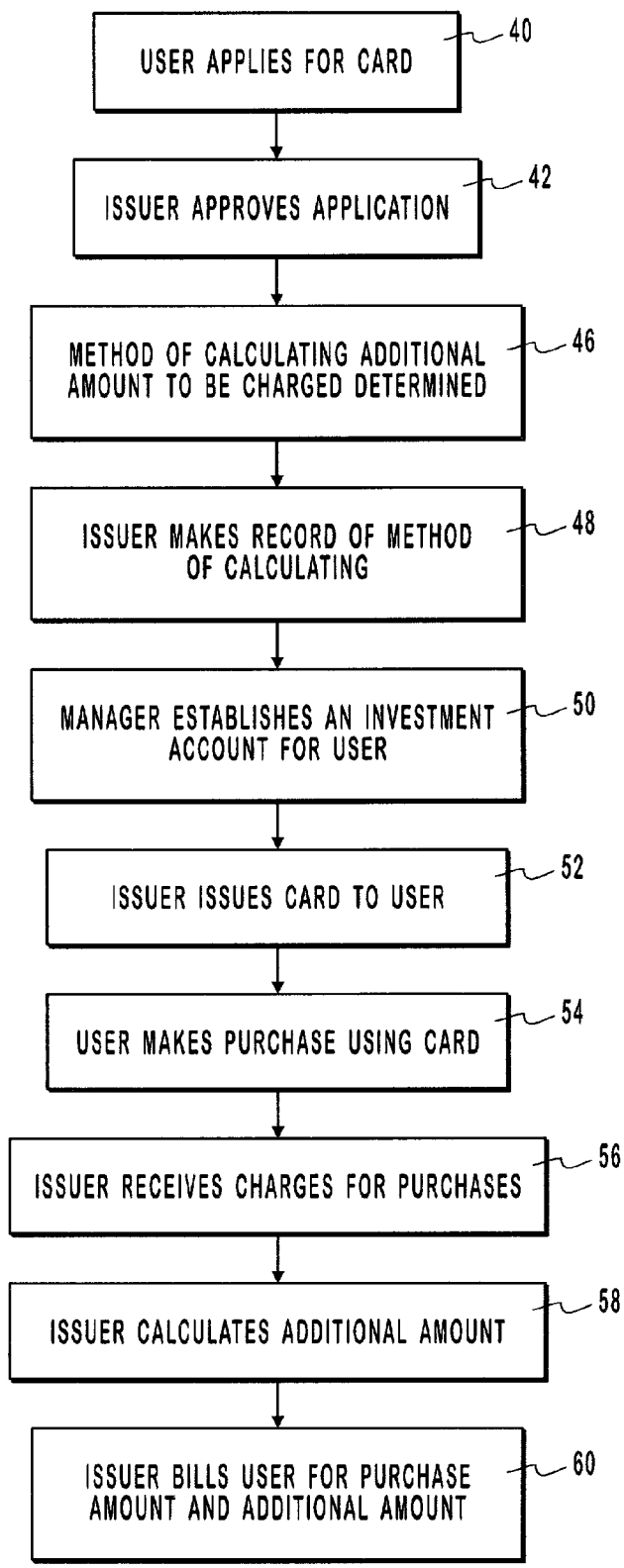
FIG. 2 is a flow diagram of an illustrative embodiment of the present invention showing a method by which a card is utilized to charge an additional amount to a user.

With reference now to FIG. 2 there is shown a flow diagram of an illustrative embodiment of the present invention showing the method by which a card is utilized to charge an additional amount to a user. In the method, the user applies for a card in step 40. Based on the application, the issuer approves the application in step 42. Once the application is approved, the method of calculating the additional amount to be charged is determined in step 46. As previously mentioned, the user or the issuer can select from a variety of methods of calculating the additional amount. Once the method of calculating the additional amount is determined, the issuer makes a record of the method of calculating the additional amount in step 48.

An investment account is established for the user in step 50. The card is issued to the user in step 52. Once the card is issued to the user, the user makes purchases using the card in step 54. Subsequent to the purchases being made, the issuer receives charges for the purchases in step 56. The issuer uses the charges received and the method of calculating to calculate the additional amount in step 58. In the present embodiment, the issuer bills the user for the purchase amount and the additional amount in step 60.

The illustrated method demonstrates how a user can utilize the card as a forced savings mechanism. The user selects the method of calculating additional amounts before the card is issued. Once the user begins making purchases using the card, the issuer bills the user for an additional amount in addition to the purchase amount. The additional amount or portion thereof then can be placed in a forced saving and/or investment account by the issuer and/or manager.

Figure 3:
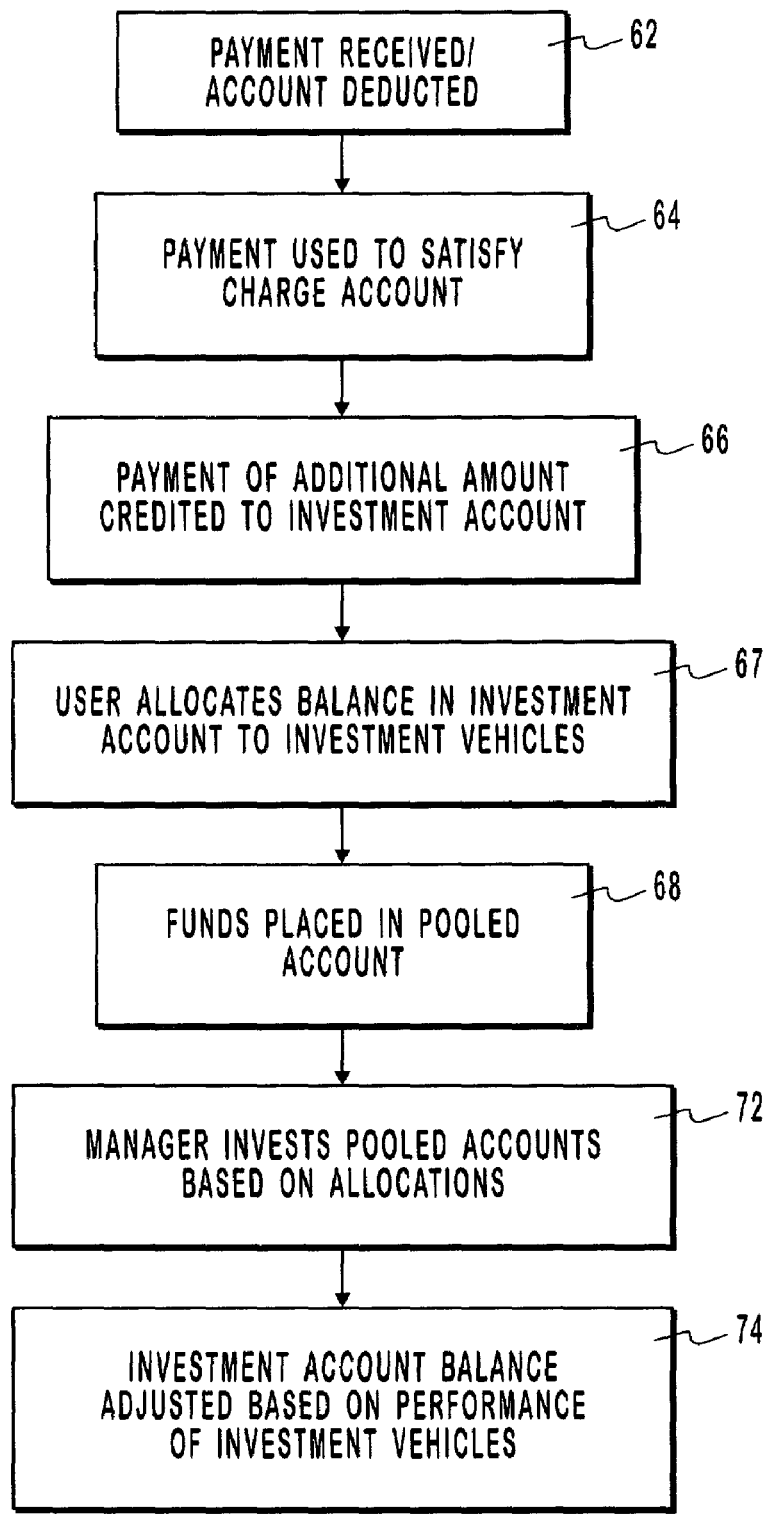
FIG. 3 is flow diagram illustrating a method by which an additional amount is utilized with a user's investment account and a pooled account.

FIG. 3 is flow diagram illustrating a method by which an additional amount is utilized with a user investment account and a pooled account as a method of saving and/or investing the additional amount. In the method, a payment is received from the user in step 62 or directly deducted from a user's account in the case of a debit card. Once the payment is received, the portion of the payment corresponding to the purchase amount is used to satisfy the charge account in step 64. The payment of the additional amount is credited to the user's investment account in step 66. In an alternative embodiment, the issuer could authorize the crediting to the user's investment account prior to receiving payment for the purchase amount, in essence loaning the user the funds credited.

The user allocates the balance in the user's investment account to one or more investment vehicles in step 67. The allocated balance of the investment account is then placed in the pooled account in step 68. The manager invests the pooled account based on the direction of user allocations in step 72. The user's balance of the investment account is adjusted based on the performance of the investment vehicles to which the user allocated the balance of the investment account in step 74.

By utilizing a pooled account the user is not required to satisfy a minimum amount before a portion of the additional amount is placed in one or more of the investment vehicles. The cumulative amount from the pooled account invested in each investment vehicle is sufficient to satisfy the minimum requirements normally associated with such investment vehicles. The investment account of each user allows the portion of the pooled account belonging to the user to be tracked. The investment accounts also allow the users to select where to invest the balance of the investment account among the plurality of investment vehicles. Additionally, the balance of the investment account can be adjusted based on the performance of the investment vehicles in which the user allocates the balance of the investment account.

For example, a user having only 50 dollars in an investment account can allocate 10% portions of the 50 dollars ($5) be invested in each of 10 investment vehicles. Each of the investment vehicles in the example has a minimum dollar requirement of 1,000 dollars before permitting an investment to be placed in the vehicle. The five dollars allocated by the user to each investment vehicle is actually a portion of the more than 1,000 dollars from the pooled account invested in each of the investment vehicles. The investment account allows the issuer, manager and/or user to designate an investment of less than the investment vehicle minimums while also permitting tracking of the investment. If the stock in one investment vehicle experiences one percent growth during a month, then $5.05 is credited to the investment account to adjust the balance of the investment account. The performance of the other investment vehicles is also used to adjust the balance of the investment account. The adjusted balance can then be reinvested based on previously selected allocations or alternatively based on reallocation of the adjusted balance.

Figure 4:
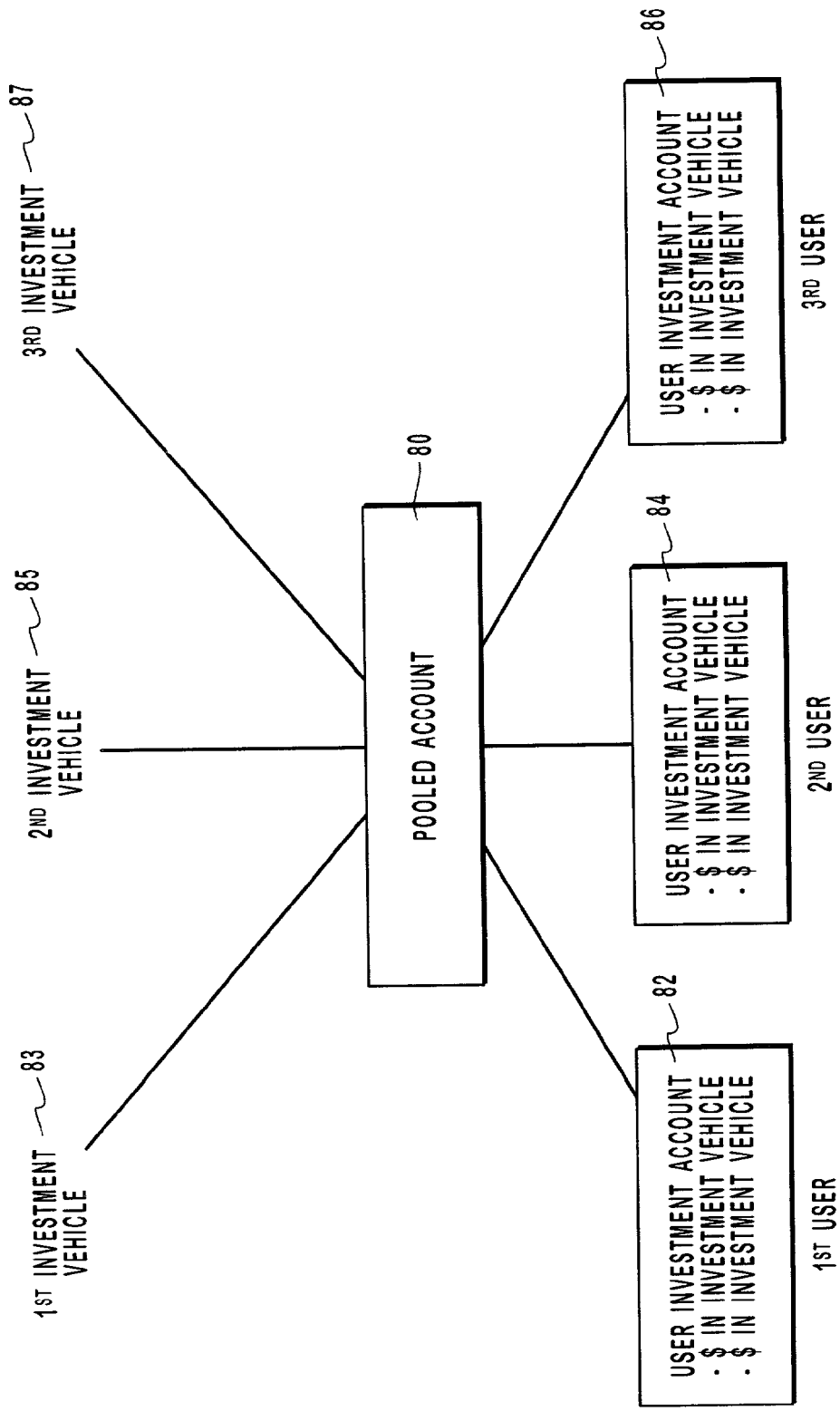
FIG. 4 illustrates how a pooled account is utilized with multiple user investment accounts to invest funds in investment vehicles.

FIG. 4 illustrates how a pooled account is utilized with multiple user investment accounts to invest in a plurality of investment vehicles. Pooled account 80 corresponds with a plurality of investment accounts. In the illustrated embodiment, the plurality of investment accounts are represented by a user investment account of a first user 82, a user investment account of a second user 84, and a user investment account of a third user 86.

The pooled account 80 is also associated with a plurality of investment vehicles. The plurality of investment vehicles are represented by $1^{st}$ investment vehicle 83, $2^{nd}$ investment vehicle 85, and $3^{rd}$ investment vehicle 87. The funds of pooled account 80 are invested in investment vehicles 83, 85, and 87. The user is provided with a plurality of investment vehicles to which the balance of the investment accounts 82, 84, 86 can be allocated. In the illustrated embodiment the balances of each of the user investment accounts 82, 84, 86 are allocated to one or more of the plurality of investment vehicles.

The plurality of investment vehicles associated with the pooled account 80 does not necessarily represent the same investment vehicles as the plurality of investment vehicles associated with investment accounts 82, 84, 86. Neither are the same investment vehicles necessarily provided to the investment accounts 82, 84, 86. In one embodiment of the present invention the plurality of investment vehicles provided to the user comprises the same investment vehicles in which the funds of the pooled account are invested. In an alternative embodiment, the plurality of investment vehicles provided to the user is a subset of the plurality of investment vehicles in which the funds of the pooled account are invested. The plurality of investment vehicles provided to the user can be selected particularly for the user. The investment vehicles can be selected based on the investment needs of the user, biographical data of the user, and/or other criteria tailored to the user.

The issuer can invest the funds of the pooled account 80 based on any of a variety of criterion. The issuer can invest the funds of the pooled account in one or more investment vehicles based the users' investment decisions. For example, the pooled account can be invested based on the investment vehicles to which users allocate the balance of their investment accounts. The funds can be invested based in whole or in part on the user allocation decisions. For example, in the event that users allocate an aggregate amount of 150,000 dollars to a given investment find, where the finds are invested based in whole on the user allocation decisions, the manager will invest funds from the pooled accounts in the amount of 150,000 dollars.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 5:
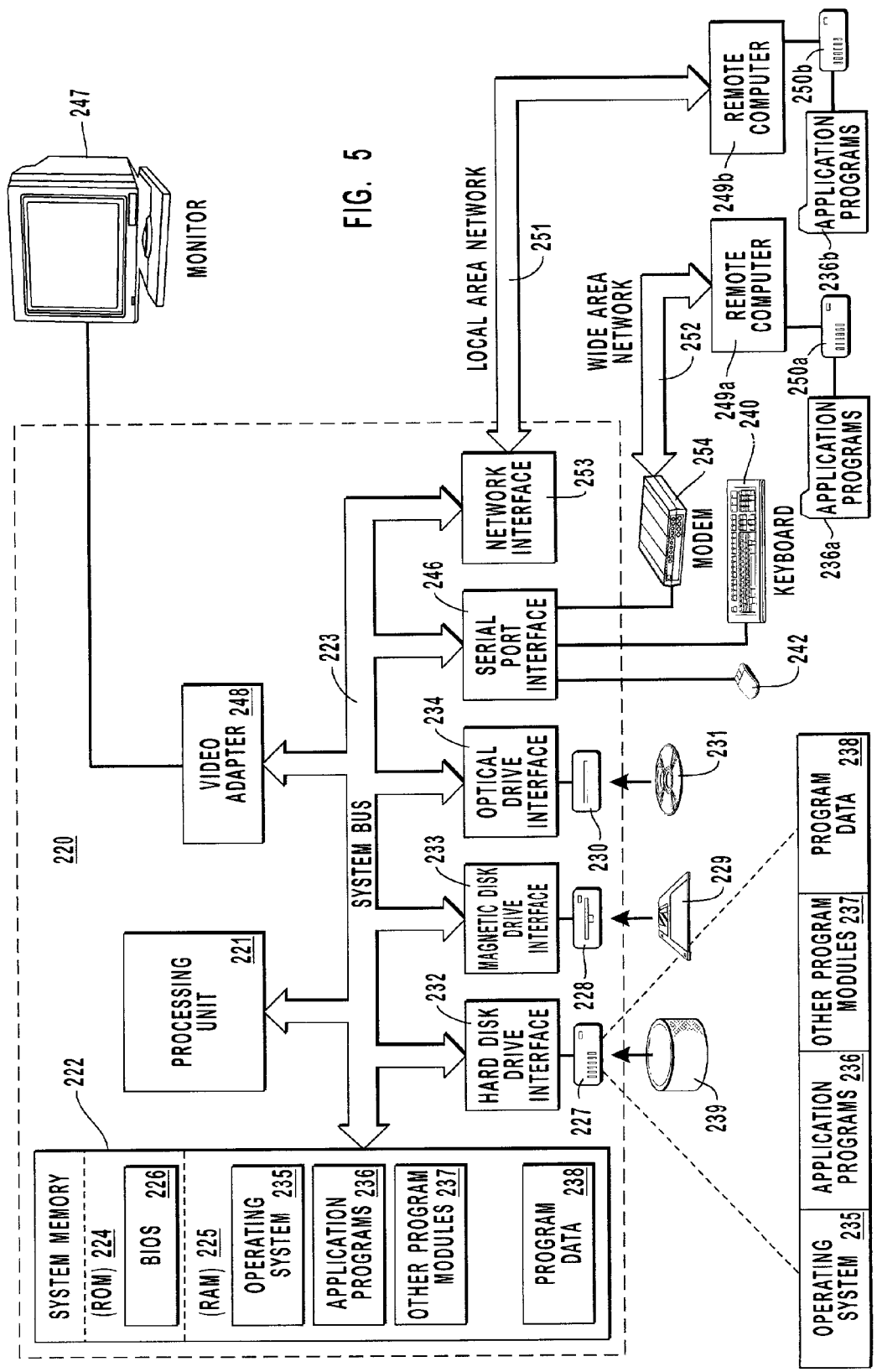
FIG. 5 is a block diagram of an illustrative operating environment in which the present invention can be implemented.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods that were disclosed above. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 220, including a processing unit 221, a system memory 222, and a system bus 223 that couples various system components including the system memory 222 to the processing unit 221. The system bus 223 may be any of several types of bus structures including a memory bus or memory controller, a peripheral bus, and a local bus using any of a variety of bus architectures. The system memory includes read only memory (ROM) 224 and random access memory (RAM) 225. A basic input/output system (BIOS) 226, containing the basic routines that help transfer information between elements within the computer 220, such as during start-up, may be stored in ROM 224.

The computer 220 may also include a magnetic hard disk drive 227 for reading from and writing to a magnetic hard disk 239, a magnetic disk drive 228 for reading from or writing to a removable magnetic disk 229, and an optical disk drive 230 for reading from or writing to removable optical disk 231 such as a CD-ROM or other optical media. The magnetic hard disk drive 227, magnetic disk drive 228, and optical disk drive 230 are connected to the system bus 223 by a hard disk drive interface 232, a magnetic disk drive-interface 233, and an optical drive interface 234, respectively. The drives and their associated computer-readable media provide nonvolatile storage of computer-executable instructions, data structures, program modules and other data for the computer 220. Although the exemplary environment described herein employs a magnetic hard disk 239, a removable magnetic disk 229 and a removable optical disk 231, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 239, magnetic disk 229, optical disk 231, ROM 24 or RAM 225, including an operating system 235, one or more application programs 236, other program modules 237, and program data 238. A user may enter commands and information into the computer 220 through keyboard 240, pointing device 242, or other input devices (not shown), such as a microphone, joy stick, game pad, satellite dish, scanner, or the like. These and other input devices are often connected to the processing unit 221 through a serial port interface 246 coupled to system bus 223. Alternatively, the input devices may be connected by other interfaces, such as a parallel port, a game port or a universal serial bus (USB). A monitor 247 or another display device is also connected to system bus 223 via an interface, such as video adapter 248. In addition to the monitor, personal computers typically include other peripheral output devices (not shown), such as speakers and printers.

The computer 220 may operate in a networked environment using logical connections to one or more remote computers, such as remote computers 249a and 249b. Remote computers 249a and 249b may each be another personal computer, a server, a router, a network PC, a peer device or other common network node, and typically include many or all of the elements described above relative to the computer 220, although only memory storage devices 250a and 250b and their associated application programs 236a and 236b have been illustrated in FIG. 5. The logical connections depicted in FIG. 5 include a local area network (LAN) 251 and a wide area network (WAN) 252 that are presented here by way of example and not limitation. Such networking environments are commonplace in office-wide or enterprise-wide computer networks, intranets and the Internet. When used in a LAN networking environment, the computer 220 is connected to the local network 251 through a network interface or adapter 253. When used in a WAN networking environment, the computer 220 may include a modem 254, a wireless link, or other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing communications over wide area network 52 may be used.

Figure 6:
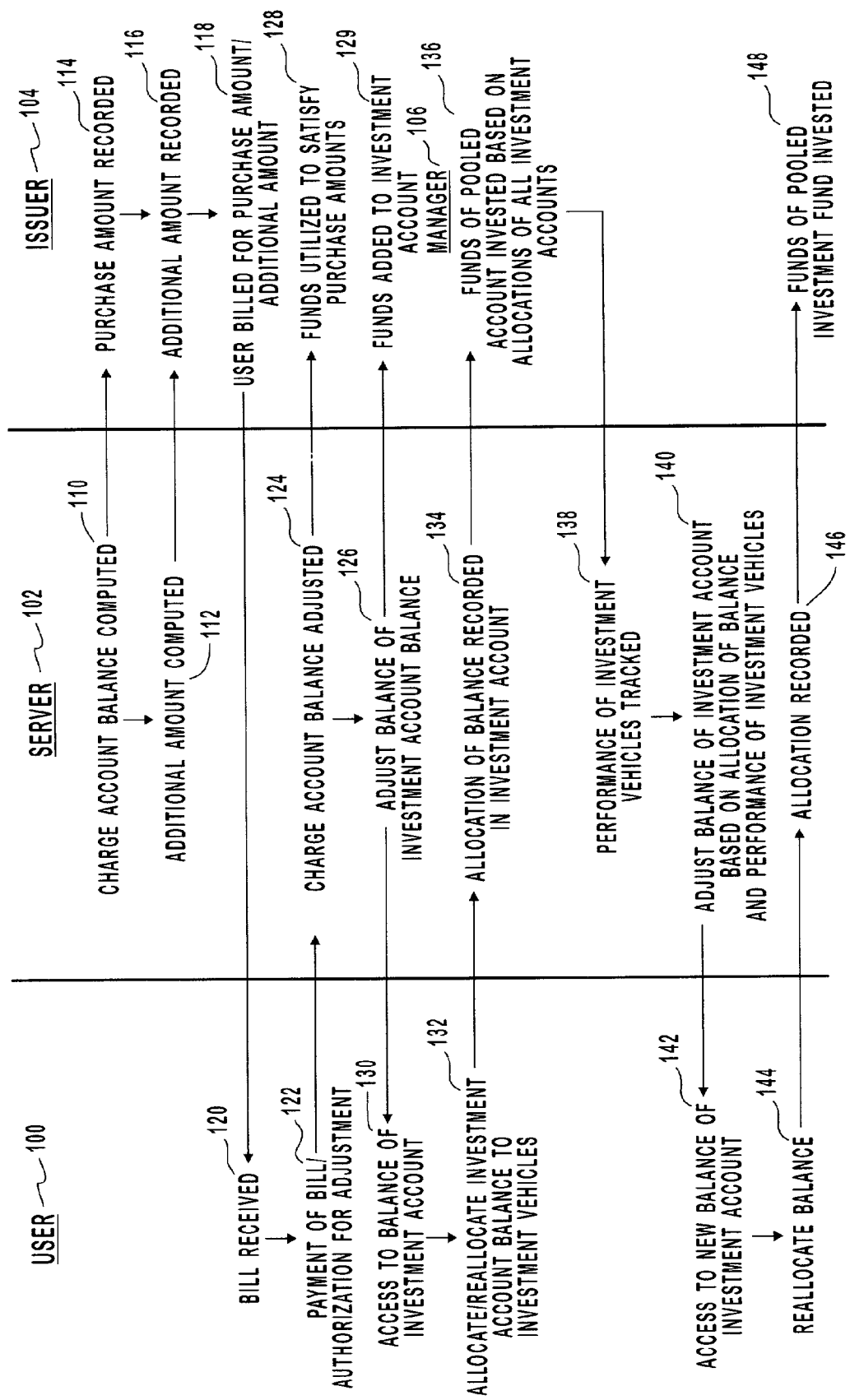
FIG. 6 illustrates an embodiment of the present invention in which a server is utilized with the money management card to facilitate investment of an additional amount charged to a user.

FIG. 6 illustrates an embodiment of the present invention in which a server is utilized with the money management card to facilitate investment of the additional amount. There is shown how the steps relate to a user 100, a server 102, and an issuer 104. In the method, an account balance of the charge account representing the purchase amount totals is computed by server 102 in step 110. Once the account balance of the charge account is computed, an additional amount is computed by server 102 in step 112. The purchase amount totals are recorded by issuer 104 in step 114. The additional amount is recorded by issuer 104 in step 116. Based on the purchase amounts recorded and the additional amount recorded, the user is billed for the purchase amounts and additional amount by the issuer 104 in step 118.

The bill is received by user 100 in step 120. Once the bill is received, payment of bill is tendered by user 100 in step 122 or authorization for adjustment given in the event of a loan from an issuer. The charge account balance is then adjusted by server 102 in step 124 based on the portion of the payment corresponding to the purchase amount. The balance of the investment account is also adjusted by server 102 based on the portion of the payment corresponding to the additional amount in step 126. In an alternative embodiment (not shown) the adjustment of investment account can be made by server 102 prior to the portion of payment corresponding to the purchase amount or in the event of a debit card, the adjustment of investment account can be made upon authorization to deduct a users account. Funds from payment of the purchase amount are utilized by issuer 104 to satisfy the purchase amount in step 128. Funds from payment or authorization of the additional amount are added to the investment account in step 129.

Access to the balance of the investment account is provided to user 100 in step 130. By accessing the balance of the investment account user 100 is able to allocate/reallocate the balance to one or more investment vehicles in step 132. The allocation of the balance of the investment account is recorded by server 102 in step 134. This allows the user to view the allocations at any time by simply accessing the investment account.

The funds of the pooled account are invested in the investment vehicles by manager 106 based on the allocations of all investment accounts as recorded by the server in step 136. It will be understood that even though FIG. 6 depicts issuer 104 and manager 106 as separate entities, the functions of manager 106 could also be performed by issuer 104. The performance of the investment vehicles is tracked by server 102 in step 138. The server adjusts the balance of the investment account based on the allocation of the balance and the performance of the investment vehicles in step 140.

User 100 is provided with access to the new balance of the investment account in step 142. By accessing the new balance, the user can reallocate the balance in step 144. The allocation of the balance is recorded by the server in step 146. Manager can invest the funds of the pooled account based on the allocation of the balance of the investment accounts in step 148.

The system charges the user an additional amount to the purchase amount. Upon receipt of payment of the additional amount, funds from the payment of the additional amount are placed in an investment account. Alternatively, funds may be placed in the investment account prior to the payment corresponding to the additional amount in the event the issuer desires to loan the user funds or may be made to the investment account upon authorization to deduct a user's account in the event of a debit card. The balance of the user investment account is adjusted based on the payment of the additional amount. The user allocates the balance of the investment account to one or more investment vehicles. By monitoring the performance of the investment vehicles, the balance of the investment account is adjusted based on the performance of the investment vehicles to which the balance of the investment account is allocated. This allows the user to utilize the money management card as a forced savings and investment mechanism.

The use of the money management card also permits the user to utilize the balance of the investment account for other uses. For example, the user can transfer a portion of the funds held in the user investment account to an investment account of another individual. The person to whom the portions of the funds are transferred can be another cardholder or a non-cardholder, such as a spouse, child, or friend. Such transfers can be made for charitable, tax, or other purposes as determined by the user. Additionally, a separate investment account for the individual to whom the transfer is being made can be created and maintained by the new user, issuer, manager, financial advisor, third party investment manager or anyone able to perform the system. A variety of uses and configurations of the card, user charge account, user debit account, investment account, pooled account, and investing mechanisms are possible within the scope and spirit of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system wherein a credit card is used to charge a purchase amount for purchases, a method for allowing a user to save a specified savings amount when using the credit card, the method comprising the computer-implemented acts of:

associating the credit card with an investment account for the user, the investment account including a pooled account that aggregates funds from a plurality of users that have been issued cards associated with a savings program thereby increasing the pool of total funds that can be invested by the plurality of users issued cards associated with the savings program, the pooled account enabling each of the plurality of users issued cards associated with the savings program and that do not individually submit savings amounts sufficient to meet minimum investment amounts for registered securities to invest along with the other plurality of users issued cards associated with the savings program in order to meet the minimum investment requirements for the registered securities;

receiving from the user an indication of registered security allocations, the registered security allocations indicating how any separate savings amounts submitted on behalf of the user are to be invested in corresponding registered securities associated with the established investment account;

receiving an indication that the user made a purchase using the credit card for a specified purchase amount;

prior to billing the indicated credit card purchase:

a computer calculating a separate savings amount to loan to the user for investment in the user's indicated registered security allocations, the calculation of the separate savings amount triggered by the purchase, the separate savings amount based on the purchase amount of the purchase, the separate savings amount being less than the minimum investment amount for the user's indicated security allocations;

the computer loaning the separate savings amount to the user for investment in the user's indicated registered security allocations such that the loaned savings amount can be invested on behalf of the user prior to billing for payment for the loaned savings amount from the user, wherein the loaned savings amount is charged to the credit card along with the purchase amount and not as a charge associated with a separate credit account; and the computer adding the loaned savings amount to the pooled account in the name of the user prior to receiving payment for the loaned savings amount so that the loaned savings amount can be pooled with savings amounts of the other plurality of users issued cards associated with the savings program in order to meet the minimum investment amounts for the user's indicated registered securities.

2. The method of claim 1, further comprising:
subsequent to investment of the loaned savings amount determining a charge from the user, the charge including 1) the specified purchase amount, and 2) the loaned savings amount that has been invested into the pooled account in the name of the user;
charging the determined charge to the user; and
receiving a payment for the determined charge subsequent to the concurrent investment of the loaned savings amount into the pooled account in the name of the user with the indicated credit card purchase.

3. The method of claim 1, wherein adding the loaned savings amount to the pooled account in the name of the user comprises adding the loaned savings amount to the pooled account in response to calculating the separate savings amount.

4. The method of claim 1, wherein a plurality of methods of calculating the separate savings amount are provided.

5. The method of claim 4, wherein said user selects a method to calculate the separate savings amount from said plurality of methods of calculating the additional amount.

6. The method of claim 1, wherein a separate savings amount is calculated for each transaction.

7. The method of claim 1, wherein a separate savings amount is calculated for more than one transaction.

8. The method of claim 1, wherein a separate savings amount is calculated using a total of all purchase amounts for a given billing cycle.

9. The method of claim 1, wherein a separate savings amount is pre-selected amount.

10. The method of claim 1, wherein a separate savings amount is calculated based on a percentage of the purchase amount.

11. The method of claim 10, wherein said percentage of the purchase amount varies depending on purchase amounts totals.

12. In a system wherein a user uses a credit card to charge a purchase amount for purchases, a method for allowing the user to save a specified savings amount when using the credit card, the method comprising the computer-implemented acts of:
authorizing the addition of a savings amount to any purchase amount corresponding to any purchases the user makes using the credit card;
submitting to a financial institution an indication of registered security allocations indicating how any separate savings amounts submitted on behalf of the user are to be invested in corresponding registered securities, the registered securities associated with an investment account established for the user, the investment account including a pooled account that aggregates funds from a plurality of users that have been issued cards associated with a savings program thereby increasing the pool of total funds that can be invested by the plurality of users issued cards associated with the savings program, the pooled account enabling each of the plurality of users issued cards associated with the savings program and that do not individually submit savings amounts sufficient to meet a minimum investment amount to invest along with the other plurality of users issued cards associated with the savings program in order to meet the minimum investment requirements;
making a purchase using the credit card, the purchase for a specified purchase amount;
a computer receiving a charge for use of the credit card, the charge including: 1) the specified purchase amount, and 2) a loaned savings amount that was loaned by the financial institution to the user prior to generation of the received charge and invested into the pooled account in the name of the user prior to generation of the received charge, the loaned savings amount having been calculated based on the sum of the specified purchase amount, the specified separate savings amount being less than the minimum investment amount, and wherein the loaned savings amount is charged to the credit card along with the purchase amount and not as a charge associated with a separate credit account.

13. The method of claim 12, wherein a plurality of methods of calculating the loaned savings amount are provided.

14. The method of claim 13, wherein said user submits a method to calculate the loaned savings amount from said plurality of methods of calculating the loaned savings amount to the financial institution.

15. The method of claim 12, wherein the loaned savings amount is a pre-selected amount.

16. The method of claim 12, wherein the loaned savings amount is a pre-selected amount is calculated based on a percentage of the purchase amount.

17. In a system wherein a debit card associated with a user's account is used to conduct purchases for a purchase amount, a method for investing a savings amount for the user in response to use of the debit card, the method comprising the computer-implemented acts of:
associating the debit card with an investment account for the user, the investment account including a pooled account that aggregates funds from a plurality of users that have been issued cards thereby increasing the pool of total funds that can be invested by the plurality of users issued cards associated with the savings program, the pooled account enabling each of the plurality of users issued cards associated with the savings program and that do not individually submit savings amounts sufficient to meet minimum investment amounts for registered securities to invest along with the other plurality of users issued cards associated with the savings program in order to meet the minimum investment requirements for the registered securities;
receiving from the user an indication of registered security allocations, the registered security allocations indicating how any separate savings amounts submitted on behalf of the user are to be invested in corresponding registered securities associated with the established investment account;
receiving a debit card authorization indicating that a user made a purchase using the debit card for a specified purchase amount;
concurrent with the debit card authorization:
a computer calculating a separate savings amount corresponding to the purchase based on the specified purchase amount, the calculation of the separate savings amount being less than the minimum investment amount for the user's indicated registered security allocations;
the computer directly deducting the specified purchase amount and the calculation of the separate savings amount from the user's account; and
the computer adding the separate savings amount to the pooled account in the name of the user so that the separate savings amount can be pooled with savings amounts of the other plurality of users issued cards associated with the savings program in order to meet the minimum investment amounts for the user's indicated registered securities in response to use of the debit card.

18. The method of claim 17, wherein said funds of said pooled account are invested in a plurality of registered securities.

19. The method of claim 17, wherein said user is provided with a plurality of registered securities to which said separate savings amount can be allocated.

20. The method of claim 19, wherein said plurality of registered securities provided to said user is a tailored subset of said plurality of registered securities in which said funds of said pooled account are invested, the tailored subset of registered securities tailored for the user based on the user's investment needs.

21. The method of claim 20, wherein said plurality of registered securities provided to said user are selected for said user.

22. The method of claim 17, wherein said plurality of registered securities provided to said user comprise said plurality of registered securities in which said funds of said pooled account are invested.

23. A computer program product for use in a system wherein a credit card is used to charge a purchase amount for purchases, the computer program product for implementing a method for allowing the user to save a specified savings amount when using the credit card, the computer program product comprising a computer-readable medium having stored thereon computer-executable instructions that, when executed at a processor, cause the system to perform the method, including the following:

associate the credit card with an investment account for the user, the investment account including a pooled account that aggregates funds from a plurality of users that have been issued cards associated with a savings program thereby increasing the pool of total funds that can be invested by the plurality of users issued cards associated with the savings program, the pooled account enabling each of the plurality of users issued cards associated with the savings program and that do not individually submit savings amounts sufficient to meet minimum investment amounts for registered securities to invest along with the other plurality of users issued cards associated with the savings program in order to meet the minimum investment requirements for the registered securities;

receive from the user an indication of registered security allocations, the registered security allocations indicating how any separate savings amounts submitted on behalf of the user are to be invested in corresponding registered securities associated with the established investment account;

receive an indication that the user made a purchase using the credit card for a specified purchase amount;

prior to billing the indicated credit card purchase:
calculate a separate savings amount to loan to the user for investment in the user's indicated registered security allocations, the calculation of the separate savings amount triggered by the purchase, the separate savings amount based on the purchase amount of the purchase, the separate savings amount being less than the minimum investment amount for the user's indicated registered security allocations;

loan the separate savings amount to the user for investment in the user's indicated registered security allocations such that the loaned savings amount can be invested on behalf of the user prior to receiving payment for the loaned savings amount from the user, wherein the loaned savings amount is charged to the credit card along with the purchase amount and not as a charge associated with a separate credit account;

add the loaned savings amount to the pooled account in the name of the user prior to receiving payment for the loaned savings amount so that the loaned savings amount can be pooled with savings amounts of the other plurality of users issued cards associated with the savings program in order to meet the minimum investment amounts for the user's registered securities.

24. A computer program product for use in a system wherein a debit card associated with a user's account is used to conduct purchases for a purchase amount, the computer program product for implementing a method for investing a savings amount for the user in response to use of the debit card, the computer program product comprising one or more computer-readable media having stored thereon computer-executable instructions that, when executed at a processor, cause the system to perform the method, including the following:

associate the debit card with an investment account for the user, the investment account including a pooled account that aggregates funds from a plurality of users that have been issued cards associated with a savings program thereby increasing the pool of total funds that can be invested by the plurality of users issued cards associated with the savings program, the pooled account enabling each of the plurality of users issued cards associated with the savings program and that do not individually submit savings amounts sufficient to meet minimum investment amounts for registered securities to invest along with the other plurality of users issued cards associated with the savings program in order to meet the minimum investment requirements for the registered securities;

receive from the user an indication of registered security allocations, the registered security allocations indicating how any separate savings amounts submitted on behalf of the user are to be invested in corresponding registered securities associated with the established investment account;

receive a debit card authorization indicating that a user made a purchase using the debit card for a specified purchase amount concurrent with the debit card authorization:
calculate a separate savings amount corresponding to the purchase based on the specified purchase amount, the calculation of the separate savings amount being less than the minimum investment amount for the user's indicated registered security allocations;

directly deduct the specified purchase amount and the calculation savings amount from the user's account; and add the separate savings amount to the pooled account in the name of the user so that the separate savings amount can be pooled with savings amounts of the other plurality of users issued cards associated with the savings program in order to meet the minimum investment amounts for the user's indicated registered securities in response to use of the debit card.

\* \* \* \* \*